(12) United States Patent
Grossman et al.

(10) Patent No.: US 7,360,172 B2
(45) Date of Patent: Apr. 15, 2008

(54) CONTACT CONTROLS

(75) Inventors: Joel K. Grossman, Seattle, WA (US); Cornelis K. van Dok, Bellevue, WA (US); Jonathan D. Perlow, Seattle, WA (US); Vivien Park, Seattle, WA (US); Sean O. Blagsvedt, Seattle, WA (US); Debra L. Weissman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 10/326,660

(22) Filed: Dec. 19, 2002

(65) Prior Publication Data

US 2004/0119758 A1   Jun. 24, 2004

(51) Int. Cl.
G06F 3/048 (2006.01)
G06F 3/00 (2006.01)

(52) U.S. Cl. ...................... 715/839; 715/751
(58) Field of Classification Search ............... 715/751, 715/839, 752
See application file for complete search history.

(56) References Cited

U.S. PATENT DOCUMENTS

| 5,214,756 | A | * | 5/1993 | Franklin et al. ............. 715/839 |
| 5,640,565 | A | | 6/1997 | Dickinson |
| 5,659,788 | A | * | 8/1997 | Someya et al. ............... 703/27 |
| 5,737,726 | A | | 4/1998 | Cameron |
| 5,767,897 | A | * | 6/1998 | Howell .................... 348/14.07 |
| 5,870,744 | A | | 2/1999 | Sprague |
| 5,873,108 | A | | 2/1999 | Goyal |
| 5,913,032 | A | | 6/1999 | Schwartz |
| 5,923,848 | A | | 7/1999 | Goodhand |
| 5,950,193 | A | | 9/1999 | Kulkarnia |
| 5,999,208 | A | * | 12/1999 | McNerney et al. ...... 348/14.08 |
| 6,014,135 | A | * | 1/2000 | Fernandes .................... 715/744 |
| 6,065,012 | A | | 5/2000 | Balsara |
| 6,208,339 | B1 | | 3/2001 | Atlas |
| 6,209,005 | B1 | | 3/2001 | Harker |
| 6,216,122 | B1 | | 4/2001 | Elson |
| 6,247,043 | B1 | | 6/2001 | Bates |
| 6,269,369 | B1 | | 7/2001 | Robertson |
| 6,339,826 | B2 | | 1/2002 | Hayes |
| 6,411,961 | B1 | * | 6/2002 | Chen .......................... 707/102 |
| 6,434,564 | B2 | | 8/2002 | Ebert |

(Continued)

OTHER PUBLICATIONS

Anderson, T., *Change Your Outlook*, Developer Network Journal, No. 25, p. 50-1, Jul.-Aug. 2001.

(Continued)

*Primary Examiner*—Weilun Lo
*Assistant Examiner*—David Phantana-angkool
(74) *Attorney, Agent, or Firm*—Workman Nydegger

(57) ABSTRACT

One or more contact controls associated with one or more corresponding contacts are displayed by a computing system at a display device. The contact controls can be hosted by any number of third party applications. The contact controls may include static and/or animated images associated with the contact to reflect a desired behavior, emotion, status or action. The contact controls are linked to contact information, such that a selection of the contact controls enables a user to access the contact information and data sources associated with the contact. A communicative action can also be initiated with the contact control by dragging and dropping the contact control onto an icon or object associated with the communication application.

50 Claims, 5 Drawing Sheets

U.S. PATENT DOCUMENTS

| | | |
|---|---|---|
| 6,460,074 B1 | 10/2002 | Fishkin |
| 6,539,379 B1 | 3/2003 | Vora |
| 6,557,004 B1 | 4/2003 | Ben-Schachar et al. |
| 6,571,235 B1 | 5/2003 | Marpe |
| 6,581,062 B1 | 6/2003 | Draper |
| 6,661,434 B1* | 12/2003 | MacPhail .................... 715/772 |
| 6,668,281 B1 | 12/2003 | Ayyadurai |
| 6,678,685 B2 | 1/2004 | McGill |
| 6,699,125 B2* | 3/2004 | Kirmse et al. ................ 463/42 |
| 6,701,348 B2 | 3/2004 | Sommerer |
| 6,718,366 B2 | 4/2004 | Beck |
| 6,753,889 B1* | 6/2004 | Najmi ........................ 715/784 |
| 6,781,608 B1* | 8/2004 | Crawford .................... 715/758 |
| 6,791,583 B2* | 9/2004 | Tang et al. ................. 715/751 |
| 6,883,000 B1 | 4/2005 | Gropper |
| 6,959,340 B1* | 10/2005 | Najmi ........................ 709/246 |
| 6,983,310 B2 | 1/2006 | Rouse |
| 6,985,924 B2 | 1/2006 | Schwartz |
| 6,988,128 B1 | 1/2006 | Alexander |
| 6,990,495 B1 | 1/2006 | Grason |
| 6,993,712 B2* | 1/2006 | Ramachandran et al. ... 715/513 |
| 7,007,149 B2 | 2/2006 | Chung |
| 7,010,572 B1 | 3/2006 | Benjamin |
| 7,010,599 B2 | 3/2006 | Shrinivasan |
| 7,010,616 B2 | 3/2006 | Carlson |
| 7,043,471 B2 | 5/2006 | Cheung |
| 7,068,768 B2 | 6/2006 | Barnes |
| 7,076,498 B2 | 7/2006 | Banerjee |
| 7,096,232 B2 | 8/2006 | Doss |
| 7,130,853 B2 | 10/2006 | Roller |
| 7,139,774 B2 | 11/2006 | Dettinger |
| 7,143,190 B2* | 11/2006 | Christensen et al. ........ 709/246 |
| 7,146,570 B2 | 12/2006 | Yeh |
| 7,149,731 B2 | 12/2006 | Dettinger |
| 7,159,207 B2* | 1/2007 | Tang et al. ................. 717/109 |
| 7,162,474 B1 | 1/2007 | Harker |
| 7,185,290 B2 | 2/2007 | Cadiz |
| 7,209,951 B2 | 4/2007 | Goldberg |
| 7,240,298 B2 | 7/2007 | Grossman |
| 2002/0073207 A1 | 6/2002 | Widger |
| 2002/0107914 A1* | 8/2002 | Charisius et al. ........... 709/203 |
| 2002/0186257 A1* | 12/2002 | Cadiz et al. ................ 345/838 |
| 2003/0041065 A1 | 2/2003 | Lucovsky |
| 2003/0069874 A1* | 4/2003 | Hertzog et al. ................ 707/1 |
| 2003/0158855 A1 | 8/2003 | Farnham |
| 2003/0208624 A1* | 11/2003 | Grossman ................... 709/245 |
| 2003/0210265 A1* | 11/2003 | Haimberg ................... 345/758 |
| 2004/0083453 A1 | 4/2004 | Knight |
| 2004/0103364 A1* | 5/2004 | Dornback ................ 715/501.1 |
| 2004/0107283 A1 | 6/2004 | Paddon |
| 2004/0119732 A1 | 6/2004 | Grossman |
| 2004/0119760 A1 | 6/2004 | Grossman |
| 2004/0122683 A1 | 6/2004 | Grossman |
| 2004/0122822 A1 | 6/2004 | Thompson |
| 2004/0177082 A1 | 9/2004 | Nitta |
| 2004/0210844 A1 | 10/2004 | Pettinati |
| 2004/0235520 A1 | 11/2004 | Cadiz |
| 2004/0243935 A1 | 12/2004 | Abramovitch |
| 2005/0015439 A1 | 1/2005 | Balaji |
| 2005/0080805 A1 | 4/2005 | Haeberle |
| 2005/0091072 A1 | 4/2005 | Dunn |
| 2005/0131888 A1 | 6/2005 | Tafoya |
| 2005/0182741 A1 | 8/2005 | Grossman |
| 2005/0262208 A1 | 11/2005 | Haviv |
| 2006/0010104 A1 | 1/2006 | Pettinati |
| 2006/0041545 A1 | 2/2006 | Heidloff |
| 2006/0053384 A1* | 3/2006 | La Fetra et al. ............ 715/765 |
| 2006/0064645 A1* | 3/2006 | Neven et al. ................ 715/753 |
| 2006/0253787 A1 | 11/2006 | Fogg |
| 2006/0277213 A1 | 12/2006 | Robertson |

OTHER PUBLICATIONS

Taylor, T.C., *Databases Save Time And Customers*, Sales & Marketing Management, vol. 142, No. 4, p. 105-7, Mar. 1990.

Kubota, K.; Masuno, H., *Multi-Media Software PI*, NEC Technical Journal, vol. 41, No. 13, p. 72-6, Nov. 1998.

Pettigrew, T., *ACT!- Automated Contact Tracking*, CA Magazine, vol. 95, No. 1022, p. 48-9, Sep. 1991.

Simaioforidis, A.; Karlgren, J.; Ereback, A., *Research and Advanced Technology for Digital Libraries, Second European Conference, ECDL '98. Proceedings*, p. 673-4, Sep. 21-23, 1998.

Heller, S.R., *Symantec ACT! 4.0 for Windows*, Journal of Chemical Information and Computer Sciences, vol. 38, No. 4, p. 772, Jul.-Aug. 1998.

U.S. Appl. No. 11/760,392, filed Jun. 8, 2007.

Padwick, Feddema, Special Edition Using Microsoft Outlook 2000, Que, Ch. 9 'Managing Contacts', p. 1-17.

Padwick, Feddema, Special Edition Using Microsoft Outlook 2000, Que, Ch. 16 'Managing Your Computer Environment': Using Other Shortcuts in the Outlook Bar, p. 1-4.

Padwick, Feddema, Special Edition Using Microsoft Outlook 2000, Que, Ch. 18 'Finding and Organizing Outlook Items': Using the QuickFind Contact Tool, p. 1-4.

Padwick, Feddema, Special Edition Using Microsoft Outlook 2000, Que, Ch. 18 'Finding and Organizing Outlook Items': Organizing Outlook Items, p. 1-7.

Padwick, Feddema, Special Edition Using Microsoft Outlook 2000, Que, Ch. 22 'Creating and Using Rules', p. 1-5.

Padwick, Feddema, Special Edition Using Microsoft Outlook 2000, Que, Ch. 38 'Creating Views and Print Styles', p. 1-25.

Padwick, Feddema, Special Edition Using Microsoft Outlook 2000, Que, Ch. 41 'Creating and Using Custom Fields': Why Do You Need Custom Fields?, p. 1-14.

Padwick, Feddema, Special Edition Using Microsoft Outlook 2000, Que, Ch. 41 'Creating and Using Custom Fields': Creating a Simple Custom Field, p. 1-3.

Padwick, Feddema, Special Edition Using Microsoft Outlook 2000, Que, Appendix C 'Outlook's Files, Folders, Fields, and Registry Keys', p. 1.

Mohamed; "Marketcircle a recipient of the 2002 Apple Design Awards"; May 15, 2002; Marketcircle.

Hibbert, Chris, "Visual Flex and XML", downloaded from www.dataaccess.com/whitepapers/xml/XMLWP.htm, dated by Wayback Machine as: May 2, 2001, pp. 1-25.

Dogac, Asuman, et al., "An ebXML Infrastructure Implementation through UDDI Registries and RosettaNet PIPs", ACMSIGMOD 2002, Madison, WI, Jun. 4-6, 2002, pp. 512-523.

Ren, Ligang, et al., "Data Synchronization in the Mobile Internet", The 7th Intl Conf on CSCW in Design, Sep. 25-27, 2002, pp. 95-98.

Lee, Jinho, et al., "An Evaluation of the Incorporation of a Semantic Network Into a Multidimensional Retrieval Engine", CIKM '03 New Orleans, LA, Nov. 3-8, 2003, pp. 572-575.

Su, Hong, et al., "Automating the Transformation of XML Documents", WIDM 2001, Atlanta, GA, Nov. 2001, pp. 68-75.

McCabe, M. Catherine, et al., "On the Design and Evaluation of a Multi-Dimensional Approach to Information Retrieval", SIGIR 2000, Athens, Greece, Jul. 2000, pp. 363-365.

Bussler, Christoph, et al., "A Conceptual Architecture for Semantic Web Enabled Services", SIGMOD Record, vol. 31, No. 4, Dec. 2002, pp. 24-29.

Nejdl, Wolfgang, et al., "EDUTELLA: A P2P Networking Infrastructure Based on RDF", WWW 2002, Honolulu, HI, May 7-11, 2002, pp. 604-615.

Bychkov, Yury, et al., "Interactive Migration of Legacy Databases to Net-Centric Technologies", Proceedings of the 8th Working Conference on Reverse Engineering, Oct. 2-5, 2001, pp. 328-334.

Bakker, John-Luc, et al., "Next Generation Service Creation Using XML Scripting Languages", IEEE International Conference on Communications, vol. 4, Apr. 22 May 2, 2001, pp. 2001-2007.

Office Action mailed Jun. 22, 2007 cited in related U.S. Appl. No. 10/692,257.

Notice of Allowance mailed Mar. 27, 2007 cited in related U.S. Appl. No. 10/324,251.
Office Action mailed Aug. 3, 2007, cited in related U.S. Appl. No. 10/324,243.
Office Action mailed Jun. 5, 2007, cited in related U.S. Appl. No. 10/885,974.
Notice of Allowance mailed Jul. 3, 2007, cited in related U.S. Appl. No. 10/324,746.
Notice of Allowance mailed Aug. 9, 2007, cited in related U.S. Appl. No. 10/324,250.
Microsoft Computer Dictionary, 2002, Microsoft Press, 5th edition, p. 162.
Kim, Sung Wan, et al., "Developing a Native Storage Structure for XML Repository System in Main Memory", 5th International Conference on High Speed Networks and Multimedia Communications, © 2002, pp. 96-100.
Shui, William M., et al., "Application of XML Schema and Active Rules System in Management and Integration of Heterogeneous Biological Data", BIBE '03, Mar. 10-12, 2003, pp. 367-374.
Banerjee, Sandeepan, et al., "Oracle8i-The XML Enabled Data Management System", 16th International Conference on Data Engineering, San Diego, CA Feb. 29-Mar. 3, 2000, pp. 561-568.
Haas, L.M., et al, "Transforming Heterogeneous Data with Database Middleware: Beyond Integration", Bulletin of the IEEE Computer Society Technical Committe on Data Engineering, © 1997, pp. 1-6.
Nambiar, Uilas, et al., "Current Approaches to XML Management", IEEE Internet Computing, vol. 6, Issue4, Jul./Aug. 2002, pp. 43-51.
Lear, Ann C., et al, "XML Seen as Integral to Application Integration", IT Professional, vol. 1, Issue 5, Sep./Oct. 1999, pp. 12-16.
Paul McFedries, Complete Idiot's Guide to Windows XP, Pub Date: Oct. 3, 2001. pp. 1-3.
Paul Thurrott's SuperSite for Windows: Internet Explorer 5.0 Reviewed. Duke Communications International, Inc. 2000, pp. 1-8.
Office Action dated Aug. 17, 2007 cited in related U.S. Appl. No. 10/780,496.
Office Action dated Aug. 23, 2007 cited in related U.S. Appl. No. 10/845,464.
Office Action dated Oct. 5, 2007 cited in related U.S. Appl. No. 10/885,974.
Notice of Allowance dated Oct. 2, 2007 cited in related U.S. Appl. No. 10/324,250.

* cited by examiner

CONTACT CONTROLS

BACKGROUND OF THE INVENTION

1. The Field of the Invention

The present invention relates to computing devices and user interfaces and, more particularly, to objects that are displayed by computing devices.

2. Background and Relevant Art

The computer industry continues to develop new and efficient means for communicating through computing devices. It is now commonplace, for example, for people to use their personal computers to communicate via e-mail, facsimile, instant message (IM), telephony, video teleconference (VTC), and so forth. This development of enabled communication through computerized devices has greatly enhanced the need for applications to store the contact information that is required for enabling communication and corroboration between contacts.

The term "contact," as described herein, generally refers to any person, group, organization, household, or other type of identifiable entity. The term "contact information" generally refers to any information that may be considered relevant for contacting, accessing, corresponding with or otherwise communicating with a contact. Contact information may include, for example, the names, aliases, telephone numbers, email addresses, IM addresses, home addresses, and web addresses of a contact. Contact information can also refer to other types of information such as the status of a contact. For example, information indicating a contact is currently connected to a network or on a telephone line may also be broadly construed as contact information.

It can be difficult for anyone to remember all of the contact information that is associated with all of the contacts that they communicate with. Accordingly, many applications are configured to store this information so that it does not have to be committed to a person's memory. For example, email applications typically utilize directories that are configured for storing the email addresses of contacts that can be emailed. Likewise, telephony applications typically utilize directories for storing telephone numbers of contacts that can be called telephonically. Other non-limiting examples of applications that store contact information include time management applications, instant messaging applications, network gaming applications, business directory applications, VTC applications, and so forth.

Many hardware devices that are not considered traditional computers are also configured to store contact information. For example, many telephone devices, facsimile devices, and photocopying devices store contact information that may be used to perform a desired function such as initiating a telephone call, a facsimile transmission, a telecopy transmission, and so forth.

In order for a user to access the contact information that is be required for initiating a communication with a contact, a user can query the contact information directory that is associated with the application or the device that will be used to transmit the communication. This step of accessing a directory associated with an application, however, is somewhat undesirable because it increases the total amount of time that is required to initiate a communication. Even when the contact information is already known, the delay in time it takes to manually enter the known contact information is also somewhat undesirable.

Yet another problem with some applications that use contact information is that they utilize contact information directories that are designed to store only limited amounts of information. For example, some contact information directories are only configured to store the contact information that is required by the associated applications (e.g., a directory associated with a telephony application may only be configured to store the telephone numbers and not email addresses). Therefore, the amount of contact information that a user can obtain from any particular application can be somewhat limited.

Another problem with exiting contact management applications is that they provide different interaction models for interacting with the contacts and contact information, increasing the burden on the user to learn the various interaction models.

BRIEF SUMMARY OF THE INVENTION

The present invention is directed to methods, systems, and corresponding computer program products for displaying contact controls that can be used to quickly access contact information and that can also be used to initiate a communicative action with a contact in an expeditious manner.

According to one aspect of the invention, one or more contact controls are displayed by one or more user interfaces of a computing device. The contact controls may, for example, be displayed on a computer desktop user interface or the user interface of any application. According to one embodiment, the contact controls are hosted by third party applications that can control the display and interactivity of the contact control. Non-limiting examples of third party applications include word processing applications, communications applications, gaming applications, and so forth. According to one embodiment, each contact control may include, although not necessarily, an image that is associated with a corresponding contact. The image may be a static image or an animated image configured to exhibit or otherwise convey certain emotions, actions, behaviors, status information, and so forth, in a non-verbal manner. In other embodiments, the contact control includes a friendly name or other information dictated by the hosting application.

The contact control is linked to one or more data sources associated with the contact so that they can be retrieved when the contact control is selected. The term data sources generally refers to entries in a database or a data structure. According to one embodiment, each contact control is associated with at least one data source comprising contact information about the contact, such that a selection of the contact control enables a user to quickly view the contact information that is associated with the contact.

According to another aspect of the invention, the contact control can be used to perform a desired task, such as to initiate a communicative action with the contact. In one embodiment, a user executes a drag and drop activity utilizing the contact control and an icon of an application or device to initiate a communicative action. For example, dragging and dropping the contact control onto an instant messaging application icon can initiate an instant message with the contact. Likewise, the instant message icon can be dragged and dropped onto the contact control to initiate the instant message.

In another embodiment, dragging and dropping the contact control onto an application interface causes the application to add the contact and contact information associated with the contact control to the application database. In another embodiment, dragging the contact control onto an application interface causes the application to perform an action with the contact control, such as sending it to another person or using contact information associated with the contact control to perform a desired activity. It will be appreciated, however, that the foregoing examples are merely illustrative and are not, therefore, intended to limit the scope of the invention. These examples have been provided to illustrate that when the contact control is dragged and dropped on an application object or interface, the application can decide what to do with the contact control and the corresponding contact information.

According to another aspect of the invention, the contact control is displayed with other information, such as emotional state and status information that is associated with the contact and that can be displayed with non-verbal images or actions. In one embodiment, the emotional state and status information is conveyed in the form of non-verbal images. For example, images of lips, hearts, faces, and other images may be used to convey emotional states that are associated with the contact. It will be appreciated that the non-verbal images can be displayed statically or dynamically (e.g., move, change shape, change size, change color, and so forth) to exhibit certain behaviors. Non-limiting examples of behaviors or actions that may be exhibited by the non-verbal images include winking, snoring, smiling, frowning, running, jumping, kissing, and so forth.

Status information can also be conveyed through non-verbal images. For example, images of clocks, telephones, other devices, beverage and food items, game icons, and other images can be used to reflect a network connectivity status, an application activity status, a location status, and a schedule status corresponding contact. It will be appreciated that these examples are provided as a matter of illustration and are not intended to limit the scope of the invention.

According to one embodiment, the contact controls can be hosted by third party applications. The behaviors, images, and status notifications associated with the contact controls are handled by the operating system of the computing system so that the applications don't have to perform any additional work, other than to indicate where the contact control should be displayed. Accordingly, the contact controls of the invention enable third party applications to provide access to contact information even when the third party applications are unaware of the contact information.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to methods, systems, and corresponding computer program products for displaying contact controls that can be used to quickly access contact information and that can be used to initiate a communicative action with and retrieve contact data for a contact. The embodiments of the present invention may comprise or be performed with a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Operating Environment

Figure 1:
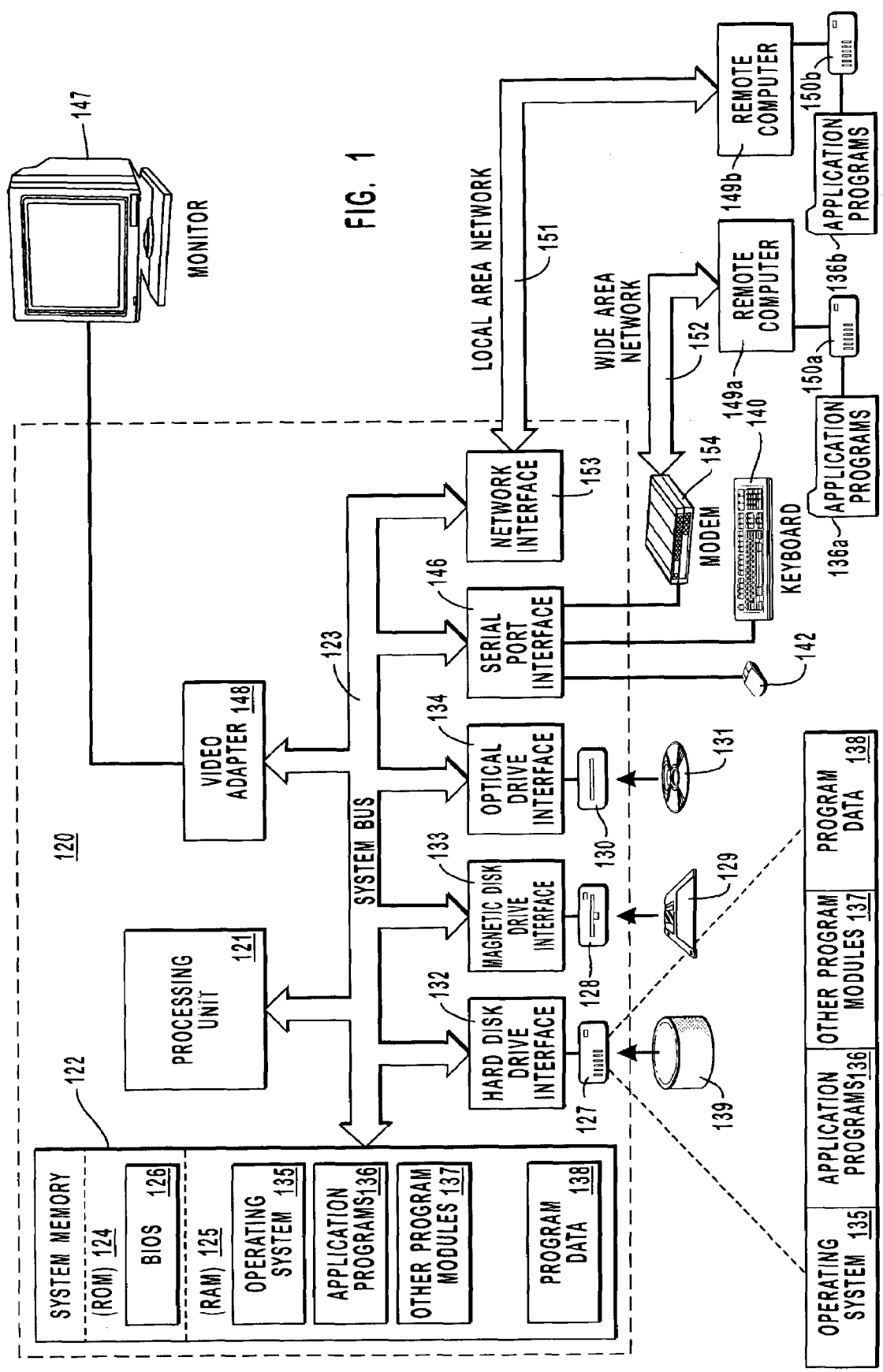
FIG. 1 illustrates one embodiment of an operating system that provides a suitable operating environment for the present invention.

FIG. 1 and the following discussion are intended to provide a brief, general description of a suitable computing environment in which the invention may be implemented. However, it should be emphasized that the present invention is not necessarily limited to any particular computerized system and may be practiced in a wide range of computerized systems including, but not limited to telephone and other communication devices, PDAs, information kiosks, and so forth.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing system in the form of a conventional computer 120, including a processing unit 121, a system memory 122 comprising computer readable media, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joystick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
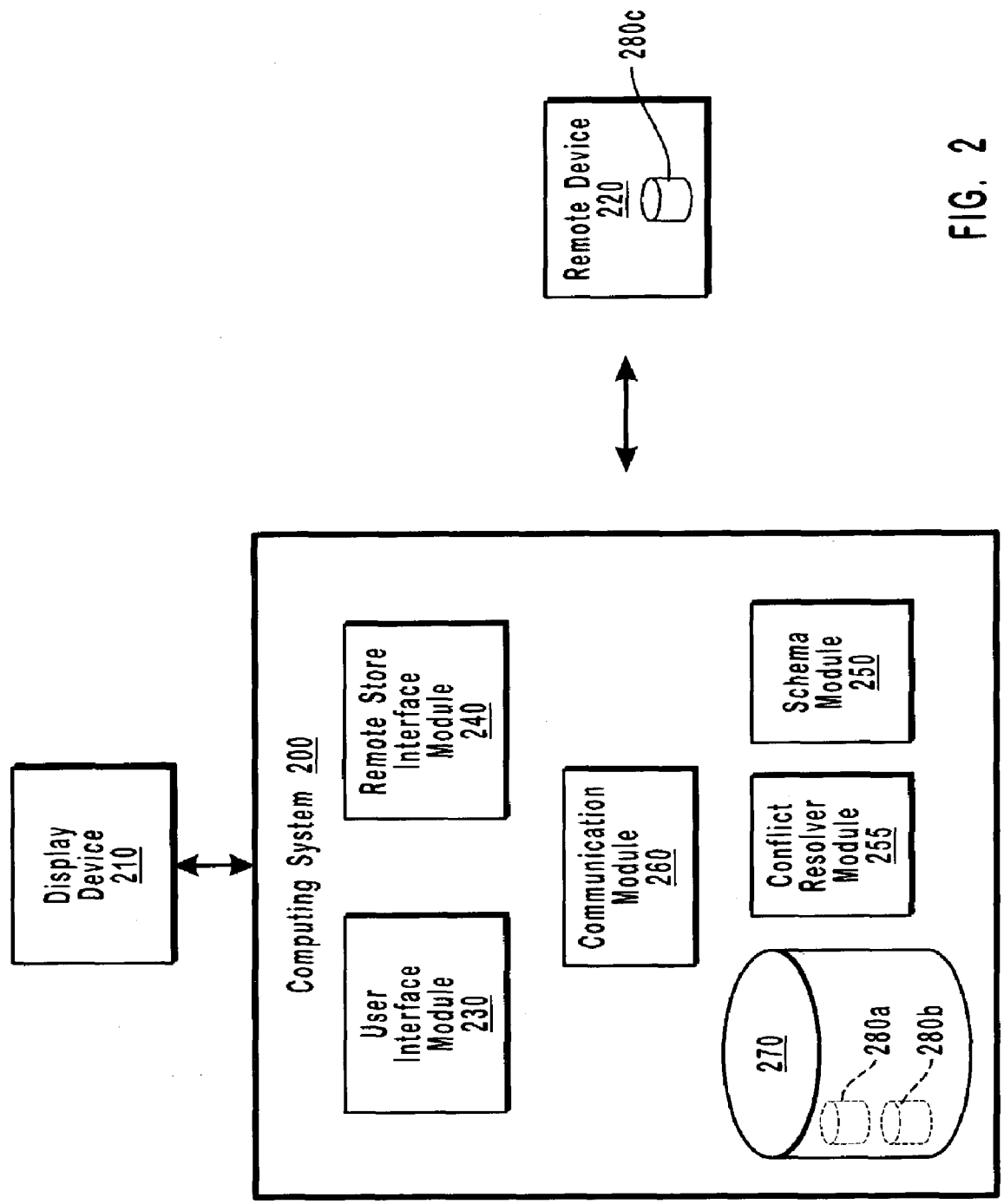
FIG. 2 illustrates one embodiment of a functional block diagram of various components of the invention.

FIG. 2 illustrates a functional block diagram of several components of the invention. As shown, a computing system 200 is connected with a display device 210 and a remote device 220. The connection link between each of these components may be a physical connection or a wireless connection. It will be appreciated that the display device 210 may be located remotely from the computing system 200 or integrally connected with the computing system 200. The display device 210 may comprise any screen, monitor, or other device that is configured to display images, such as the contact controls described below, with particular reference to FIGS. 4A-4I and FIG. 5.

During use the computing system 200 utilizes one or more user interfaces to display the contact controls and contact information at the display device 210. The functionality of the user interfaces to display the contact controls and contact information is enabled by various computer modules, such as user interface module 230, remote store interface module 240, schema module 250, conflict resolver module 255, and communication module 260, each of which will now be described.

The user interface module 230 includes sufficient computer executable instructions for operably displaying user interfaces at the display device and for responding to user input entered with the computing system 200. The user interface module 230 also includes suitable computer-executable instructions for enabling the contact controls to be hosted by third party applications and in such a way that the third party applications can control certain behaviors of the contact controls, as described herein.

The remote store interface module 240 includes sufficient computer executable instructions for receiving, searching and processing information such as contact information and other contact status information that is stored at the remote device 220. Remote device 220 may be a remote computer, server containing contact information. Non-limiting examples of status information that may be received from the remote device 220 include a network connectivity state indicating whether the remote device is connected to a particular network. Other examples of status information and state information are provided below with reference to FIGS. 3-5.

The schema module 250 contains sufficient computer executable instructions for mapping contact information into categories and classifications that can be recognized by the user interfaces for display on the display device 210. The schema module 250 is useful for enabling contact information from remote stores to be organized according to a single unifying schema. The schema module 250 may also be used to map and identify contact information stored in local stores, such as storage media 270.

The conflict resolver module 255 includes sufficient computer executable instructions for comparing disparate contact information and for determining which of the contact information is most accurate and appropriate for a given application based on instructions received from the API of a given application. Conflict resolver module 255 also monitors and determines what contact information is most likely to be expected or used by a user, such as, for example, based on the past use of the contact information. Accordingly, the conflict resolver module 255 may utilize space on a storage medium, such as storage media 270 for tracking use of contact information.

The communication module 260 includes sufficient computer executable instructions for enabling communication between the various modules, as well as the display device 210, the remote device 220, and the storage media of the remote device 220 and computing system 200. In particular, the communication module enables the modules to access and process contact information that is stored in one or more contact information directories that may be stored locally and remotely. The communication module 260 may also comprise suitable computer executable instructions for communicating with various applications to initiate a communicative action associated with a communication application, as described below in reference to FIGS. 3-5.

The present embodiment also illustrates three contact information directories, 280a, 280b, and 280c that correspond to different data sources from which the desired contact information may be obtained. For example, directory 280a may correspond to an email directory and directory 280b may correspond to a telephony directory. It will be appreciated, however, that the invention is not limited to use with any particular number of contact information directories or applications to which they correspond.

Contact Controls

Figure 3:
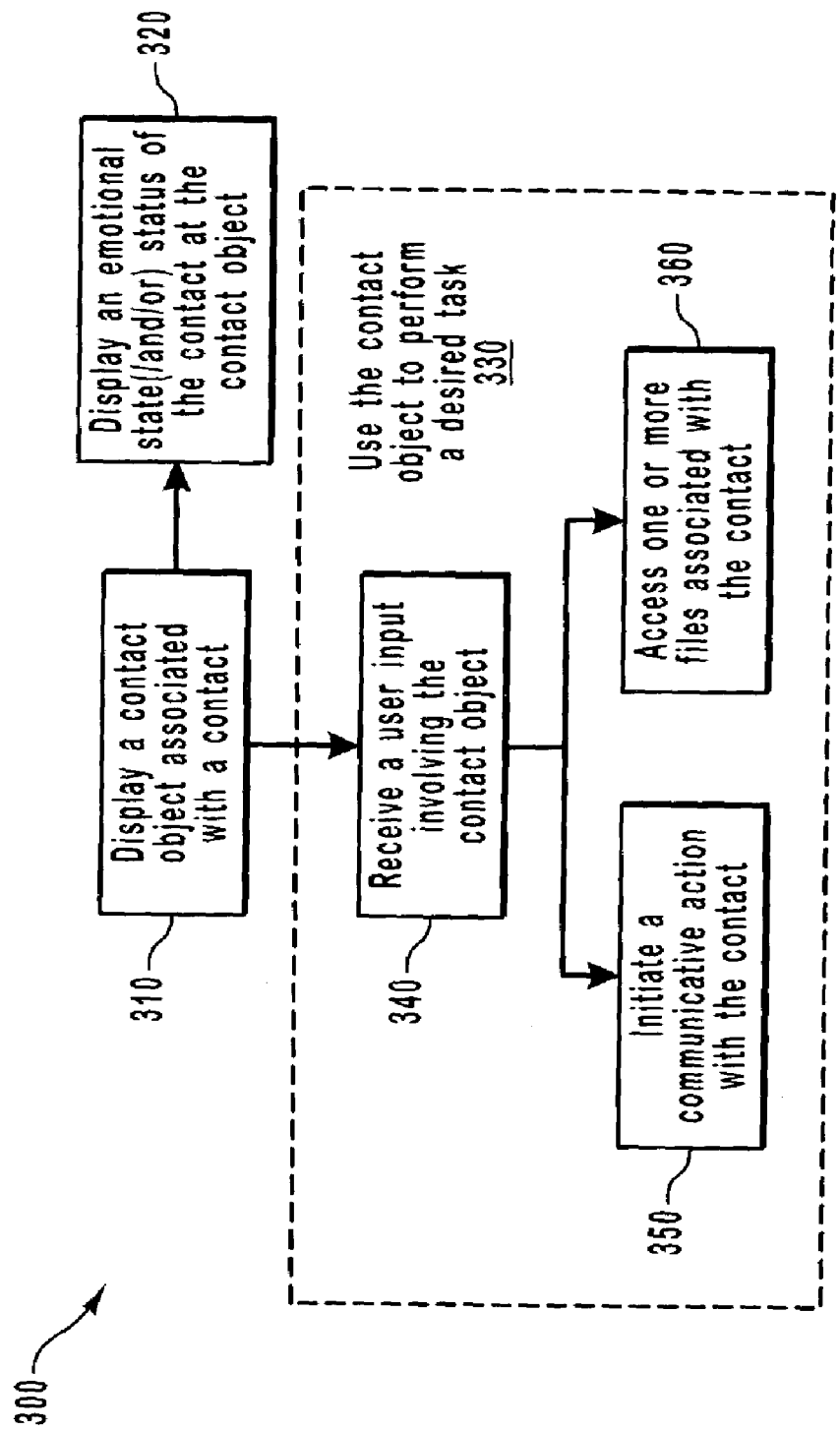
FIG. 3 is a flowchart illustrating certain acts of a method for displaying contact controls according to the invention.

FIG. 3 illustrates a flowchart 300 of one method for displaying and utilizing a contact control. As shown, the method includes various acts (acts 310, 320, 340, 350, 360) and a step (step 330), each of which will now be described.

Initially, the method includes the act of displaying a contact control associated with a contact (act 310). This act generally includes displaying an image associated with the contact at the display device of a computing system with the use of a suitable user interface. The image that is associated with the contact may be associated with the contact by the client user, by the contact, or by any other person. If the contact has not broadcast an image that they wish to be associated with and the client user has not associated an image with the contact then a generic image may be provided and associated with the contact until another image is supplied. In one embodiment, the contact control is hosted by one or more third party applications that can control how the contact control image is displayed. In certain embodiments, the hosting application can edit or modify the contact control image.

Figure 4A:
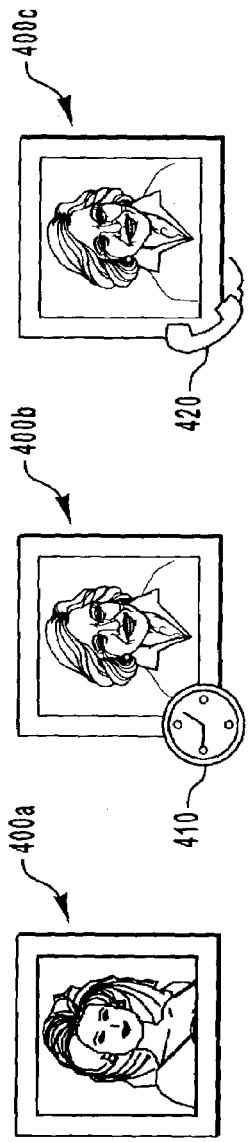
FIGS. 4A-4I illustrate various embodiments of contact controls, some of which are displayed with corresponding non-verbal images corresponding with one or more emotional states and statuses of a contact.
Figure 4B:
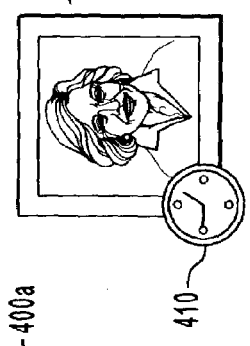

FIG. 4a illustrates one example of a contact control image 400a that may be displayed by a user interface. This image 400a may be a photographic image of the contact, for example, or any other image that can be associated with the contact. It will be appreciated that the invention is not limited to displaying contact controls of any particular size or shape. Accordingly, the contact control images 400a may be displayed in any size dictated by screen resolution or other display capabilities. It will also be appreciated, as mentioned above, that the contact control image or tile can also include a dynamic or animated image exhibiting certain behaviors. Accordingly, the contact control image is not limited to static images of a contact's face. Rather, the contact control image can comprise any image that is displayed in a static manner or a dynamic manner to exhibit desired behaviors or actions. Non-limiting examples of actions and behaviors that can be exhibited by the contact control image include running, walking, talking, jumping, and behaviors associated with facial expressions (e.g., winking, blowing kisses, frowning, and so forth).

One benefit providing an image for the contact control is that it provides a presence for the contact at the user's computer, much in the same way an application icon provides a presence for an application at the user's computer. The image can also be a tool for personalizing the presence of the contact at the user's computer. For example, the contact control image can express custom presence information, such as what the contact is presently doing (e.g., homework at the library, yard work, and so forth).

According to one embodiment, non-verbal images/actions can be displayed with a contact control to convey a variety of information about the contact that is associated with the contact control. This variety of information may include, for example, status information to indicate a network connectivity status, an application activity status, a location status, a schedule status, or any other status. Non-verbal images can also be used to convey emotional information associated with a contact. The emotional information may convey an emotion felt by the contact, or an emotion felt about the contact. In certain circumstances, non-verbal images can also be used to reflect communications received from the contact. By way of example, and not limitation, a contact could send someone a "wink", causing the contact control image at the recipient's computer to wink at the recipient.

FIGS. 4B-4F illustrate some examples of contact control images 400b-400f that are in displayed in conjunction with non-verbal images 410, 420, 430, 440 and 450 to convey status information. For example, in FIG. 4B, a contact control image 400b is displayed along with a clock image that may be used to indicate that the contact is either busy or available at the current time. The clock image may also be used to indicate that the contact is currently connected to a network with which the client user is connected.

Figure 4C:
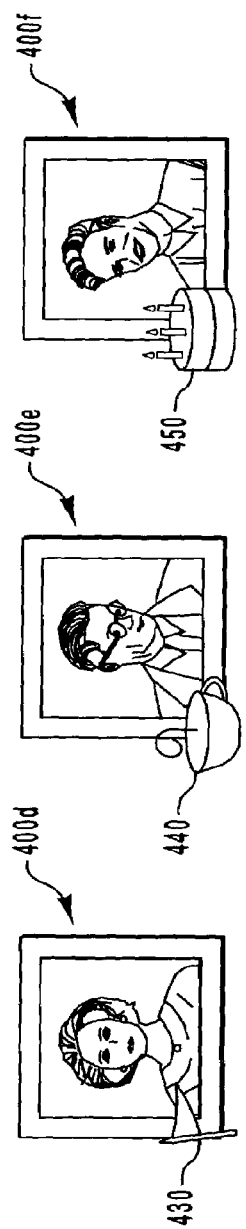

In FIG. 4C, the contact control image 400c is displayed along with a telephone image. This image may be used to indicate the contact is currently utilizing or connected with a telephone or telephony network.

Figure 4D:
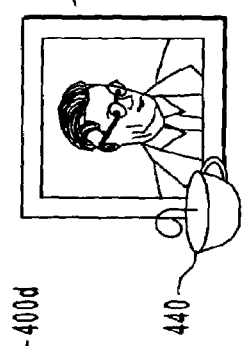

FIG. 4D illustrates one example in which a contact control image 400d is displayed with a non-verbal image comprising a flag 430. A flag may be used to indicate that the contact has recently sent a communication to the user, such as, for example, an email message. Likewise, the telephone image 420 can be used to indicate a telephony message has been received. To receive the unopened message, the user can click on the contact control image 400d to launch the appropriate application that can be used to process the received message.

Figure 4E:
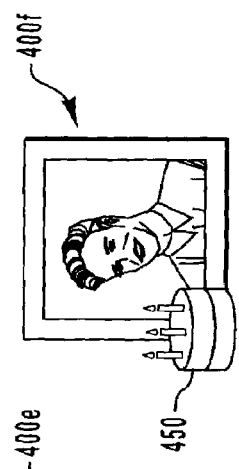

FIG. 4E illustrates one example in which a contact control image is displayed with a beverage image. Beverage and food images may be used, for example to convey the idea that the contact is currently on a break or out to eat.

Figure 4F:
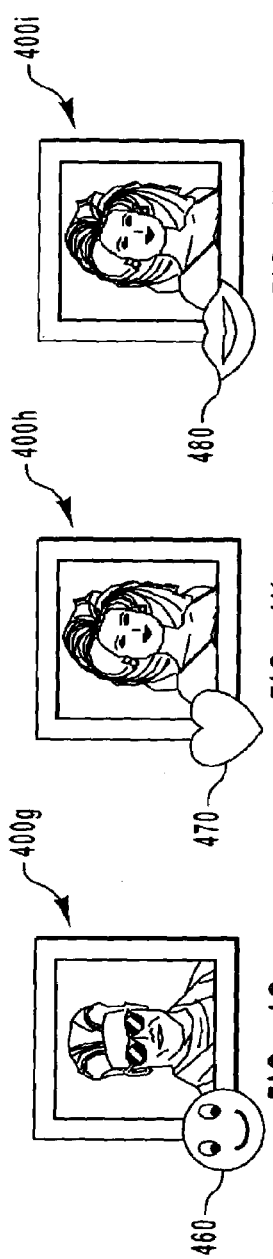

FIG. 4F illustrates one example in which a cake image is displayed concurrently with the contact control image 400f. This may be done, for example, to convey the idea that it is contact's birthday or that the contact is having a party.

Other examples of non-verbal images that may be used to convey a contact status include icons of applications to indicate that the contact is presently using an application. For example, a game application may be displayed to indicate that a contact is presently playing a game. This can be useful, for example, for enabling a user to know when to join others in a multi-user/player application.

According to one embodiment, the contact controls are also displayed with non-verbal images that convey emotional information about a contact. Emotional information may include the emotions being felt by the contact or emotions a user feels about the contact. This emotional information may be published by a contact or determined by a user viewing the contact control.

Figure 4G:
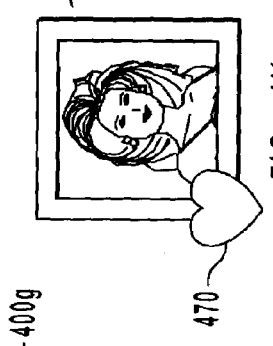
Figure 4H:
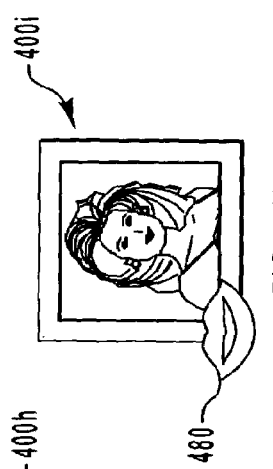
Figure 4I:
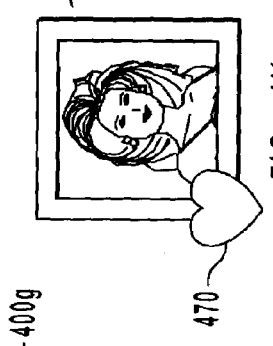

FIGS. 4G-4I illustrate examples of contact control images 400g, 400h and 400i that are displayed with non-verbal images 460, 470 and 480 that can be used to convey emotion information about a contact. For example, contact control image 400g is displayed concurrently with an animated face 460 that can be used to convey the contact is in a good mood. Animated face 460 can also be used to convey that the contact is liked by the user. The contact control image can also exhibit certain emotional information through animation. For example, the image can walk around the screen, climb, wave, wink, go to sleep, and so forth.

FIG. 4H illustrates an example in which a contact control image 400h is displayed with a heart image 470. The heart image 470 can be used to convey the contact is in a loving mood, that the contact loves the user, or that the contact is loved by the user. It will be appreciated that a user can use any suitable user interface to add non-verbal images to the contact control image to associate an emotional feeling with the contact. In one embodiment, a menu is provided with available non-verbal images. In another embodiment, a user creates the images to add to the contact control.

The information that is used to make a determination as to what the status or emotional state of a contact is can be published by the contact and sent to the user's computing system 200. In certain embodiments, the contact status information can also be obtained by the computing system 200 querying one or more data stores containing the contact's status information, including, but not limited to the data store of the contact's computing device.

FIG. 4I illustrates yet another embodiment in which a contact control image 400i is displayed with a non-verbal image to convey information. In this example, an image of lips 480 is used to convey a communication from the contact to the user. For example, the lips 480 may comprise a visual kiss that is transmitted to the user from the contact. As mentioned above, animation can also be utilized to convey or enrich the communication. For example, the displayed image of the lips could become enlarged and fade out, move, explode, or otherwise exhibit some animated action or behavior.

It will be appreciated that the foregoing examples are merely illustrative, and are not intended to limit the scope of the invention. Accordingly, although only non-verbal images are shown in the foregoing examples (FIGS. 4B-4I), it will be appreciated that the invention also extends to embodiments in which text could also be provided along with the non-verbal images. It will also be appreciated that the images providing status or emotional information do not necessarily have to overlay the contact control image, as shown in FIGS. 4B-4I. Rather, the status and emotional state images only need to be displayed in sufficient proximity with the contact control image to convey an association. Likewise, it will be appreciated that the contact controls may be displayed with any number of verbal and non-verbal images simultaneously.

According to one embodiment, the contact controls include friendly names or other contact information specified by a hosting application. Thus, contact information may be displayed alone or with an image, such as with one of the images described above.

Returning now to FIG. 3, the method of the invention also includes the step of using the contact control to perform a desired task, step 330. Step 330 may include any corresponding acts that are suitable for enabling the contact control to perform a desired task. In the present embodiment, step 330 includes the corresponding acts of receiving user input involving the contact control and upon receiving this user input either initiating a communicative action with the contact (act 350) or accessing one or more data sources that are associated with the contact (act 360). It will be appreciated that this action may be received by the hosting application.

In one embodiment, for example, a user can access a user interface containing contact information about a contact by selecting the contact control. The contact information that can be obtained from selecting the contact control may include any contact information that is deemed relevant, including, but not limited to, the contact's name, email address, a telephone number, a postal address, and an instant messaging address.

The selection of a contact control can include any suitable means for selecting an object that is displayed by a computing system. In one embodiment, the contact control is selected by double clicking on the contact control with a mouse prompt. Selecting the contact control may also provide access to other information associated with a contact. For example, as mentioned above, selecting a contact control may launch an application, like an email application, to view any unread messages from the contact. Launching an application, such as an email application by selecting the contact can also provide a means for sending a communication to the contact.

Figure 5:
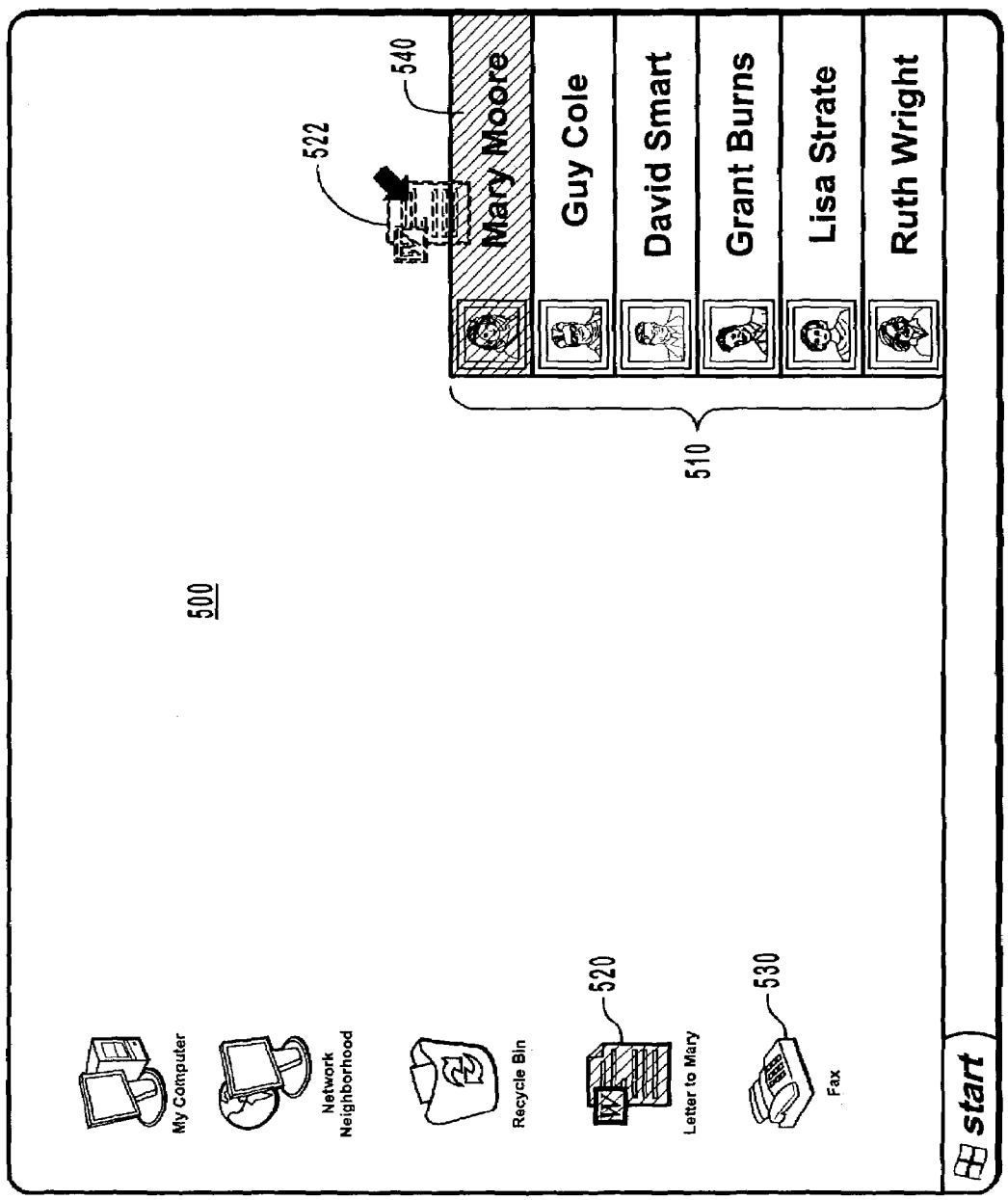
FIG. 5 illustrates one embodiment of a computer desktop that is displayed with contact controls and other icons.

FIG. 5 illustrates one example of a desktop user interface 500 that is displaying various application icons, including a Word document icon 520 and a facsimile device icon 530. The interface 500 is also displaying a group of contact controls 510. In this embodiment, the contact controls 510 are displayed with names of contacts. The names may be real names or fake names associated with the contacts.

FIG. 5 is provided to illustrate one embodiment in which the contact controls can be used to initiate a communicative action with a contact. The term communicative action refers to any action involving communication including, but not limited to, initiating an instant message, an email, an electronic file transmission, a facsimile, a video feed, a video teleconference, a telephony call, and a telephone call.

In one embodiment, a file can be sent to a contact by dragging and dropping the file onto the contact control. This is one non-limiting example of an application receiving user input with the contact control. For example, a user can drag a phantom image 522 of the Word document file 520 onto contact control 540 to send a copy of the corresponding Word document to the contact that is associated with the contact control 540. Dropping the phantom image 522 of the Word document onto the contact control 540 initiates an instant message application, email application, FTP application, or another application that is set as a default in the user's computer settings for sending Word documents.

It will be appreciated that the foregoing example is merely illustrative of one embodiment for initiating a communicative action using the contact controls of the invention. Accordingly, contact controls can also be used to initiate communicative actions in other ways. In another embodiment, an application can be initiated or sent to a contact when the contact control associated with the contact is dragged and dropped onto the icon or another launch object that is associated with the file or a host application. For example, if the contact control 540 were to be dragged and dropped onto the fax icon 530 then the fax application associated with the fax icon 530 would be launched. In another embodiment, dragging and dropping the contact control onto an application interface causes the instant message user interface to add the contact and contact information associated with the contact control to the application's database.

In one embodiment, whenever a communication application is launched in response to user input that involves a contact control, the communication application is automatically provided with the contact information that is necessary to initiate a communication with the contact. For example, if an email application is launched in direct response to a user selecting a contact control or dragging and dropping the contact control on the email's application icon, then the email application will automatically be supplied with the contact's email address so that the user doesn't have to enter it. The contact information can be accessed and provided through the modules of the computing system 200, as described above. One or more API's can also be used to handle the contact information and to provide it to the applications in the desired format.

Similarly, if the email application is already open, dragging the contact control into the "To:" line automatically populates the "To:" line with the email address or other contact information that is necessary to complete the communication. Dragging and dropping the contact control directly into the body of the email message can also attach the contact control to the email message so that it can be sent to the intended recipient.

According to one embodiment, as mentioned above, the contact control can be hosted by third party applications without creating a burden on the third party applications. This does not, however, mean that the third party applications cannot exercise control over the contact control. For example, the third party applications may be configured to edit or otherwise control the display of the contact control image, such as by controlling when and where the contact control is displayed.

The third party application can also control the interactive functionality of the contact control, such as, for example, by defining what occurs when the contact control is clicked on, dragged and dropped, etc. For example, an application may accept default settings that cause a single click on the contact object to launch a concise contact card containing limited amounts of contact information (e.g., name, address, email address, telephone number, and so forth) and that causes a double click on the contact object to launch a detailed contact page including additional information and links associated with the contact. The hosting application may, however, override and control the interactive functionality of the contact control by defining other actions or activities that will occur when the contact control is clicked on.

One benefit of providing an interaction model for interacting with the contact controls, as described above, is that a user does not have to learn numerous different interaction models for various applications. According to one embodiment, the interaction model for interacting with the contact controls includes a response to a right mouse click and a response to a double mouse click. The right mouse click on the contact control, for example, launches a context menu of tasks (e.g., cut, copy, paste, delete, save to my address book, and so forth) that may be performed on or with the contact control. The double mouse click on the contact control launches a full contact details page, containing various contact information about the contact, as described above. It will be appreciated, however, that this interaction model may be modified to accommodate any desired need or preference.

In summary, the present invention provides contact controls that can be associated with people, groups, organizations, households, and other such contacts. The contact controls can display images that are associated with the contacts to provide a virtual presence and personality of the contact at the user's computer. The contact controls can also be displayed with non-verbal images to convey other information about the contacts, including status and emotional state information. The contact controls are also linked to data sources that are associated with the contacts so that the associated data sources can be accessed when the contact controls are selected. The contact controls can also be used to initiate a communicative action with the contacts. It will be appreciated that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that is connected with a display device, and that is configured to display one or more contact controls at the display device, wherein the one or more contact controls are hosted by one or more third-party application programs where at least one of which can control the display and interactivity of a contact control, a method for executing actions with or between the one or more third-party application programs utilizing the one or more contact controls displayed at the display device, the method comprising:

an act of a third party application hosting the contact control displayed at the display device, the contact control being associated with a corresponding contact and with one or more external data sources that are independent of the third party application, such that the data sources can be retrieved from the one or more external data sources when the contact control is selected, the data sources comprising contact information;

an act of receiving a user input that involves the contact control, wherein the user input comprises dragging the contact control onto a third party application icon, dragging a third party application icon onto the contact control, dragging a file icon onto the contact control, or dragging the contact control onto a file icon;

upon receiving the user input, an act of accessing contact information associated with the corresponding contact from the one or more data sources;

determining, based at least in part upon the received user input, an action to be initiated involving at least the corresponding contact;

determining, based at least in part upon the received user input, which contact information is most accurate and appropriate; and also upon receiving the user input, an act including at least one of initiating a communicative action with the contact and accessing one or more data sources associated with the contact.

2. A method as recited in claim 1, wherein the contact control includes an image associated with the contact, the image including at least one of a static image and an animated image.

3. A method as recited in claim 1, wherein the contact control includes a link to one or more data sources associated with the contact, such that when the contact control is selected at the display device, the selection of the contact enables a user to access the one or more data sources associated with the contact.

4. A method as recited in claim 3, wherein accessing the one or more data sources associated with the contact includes displaying one or more database entries associated with the contact at the display device.

5. A method as recited in claim 4, wherein the one or more data sources include one or more database entries comprising contact information of the contact.

6. A method as recited in claim 1, wherein the communicative action includes at least one of an instant message, an email, an electronic file transmission, a facsimile, a video feed, a video teleconference, a telephony call, and a telephone call.

7. A method as recited in claim 6, wherein the communicative action is initiated when either the contact control is dragged and dropped onto an application launch object and when the application launch object is dragged and dropped onto the contact control.

8. A method as recited in claim 7, wherein the application launch object includes an icon of the application.

9. A method as recited in claim 7, wherein the application launch object includes an icon of a file that is utilized by the application.

10. A method as recited in claim 1, further including an act of displaying one or more of an emotional state and a status associated with the contact proximate the contact control.

11. A method as recited in claim 10, wherein the one or more emotional state and status associated with the contact are displayed as one or more non-verbal images.

12. A method as recited in claim 11, wherein the one or more non-verbal images include one or more of a flag, lips, an animated face, a heart, a clock, a telephone, a beverage, a food item, and a game icon.

13. A method as recited in claim 10, wherein the one or more non-verbal images are animated to exhibit one or more of a desired behavior and a desired action.

14. A method as recited in claim 10, wherein the one or more emotional state and status are determined by data received from the contact.

15. A method as recited in claim 14, wherein the one or more emotional state and status include a status of having sent a correspondence to a user.

16. In a computing system that is connected with a display device and that is configured to display one or more contact controls at the display device, wherein the one or more contact controls are hosted by corresponding one or more third-party application programs that can control the display and interactivity of the contact control, a method for utilizing the one or more contact controls displayed at the display device, the method comprising:

an act of a third party application, distinct from a contact control and independent of the contact control, displaying the contact control at the display device, the contact control being associated with a corresponding contact and linked to an external data source that is independent of the third party application;

an act of the third party application, the third party application being distinct from the contact control and independent of the contact control, receiving a user input that involves the contact control;

upon receiving the user input, an act of accessing contact information associated with the corresponding contact;

determining which of the accessed contact information is accurate and appropriate;

an act of initiating a communicative action with the contact when the user input further involves a communication application; and an act of accessing one or more data sources associated with the contact when the user input includes making a selection of the contact control.

17. A method as recited in claim 16, wherein the contact control includes one or more of a static image and an animated image associated with the contact.

18. A method as recited in claim 16, wherein accessing the one or more data sources associated with the contact includes displaying database entries associated with the contact at the display device.

19. A method as recited in claim 18, wherein the one or more data sources include a database entry comprising contact information of the contact, the contact information including one or more of a name, an email address, a telephone number, a postal address, and an instant messaging address.

20. A method as recited in claim 16, wherein the communicative action includes at least one of an instant message, an email, an electronic file transmission, a facsimile, a video feed, a video teleconference, a telephony call, and a telephone call.

21. A method as recited in claim 20, wherein the communicative action is initiated when either the contact control is dragged and dropped onto an application launch object and when the application launch object is dragged and dropped onto the contact control.

22. A method as recited in claim 21, wherein the application launch object includes an icon corresponding to the communication application, wherein the communication application is a different third-party application program.

23. A method as recited in claim 21, wherein the application launch object includes an icon of a file that is utilized by the communication application.

24. A method as recited in claim 16, further including an act of overlaying the contact control with one or more non-verbal images reflecting an emotional state associated with the contact.

25. A method as recited in claim 24, wherein the one or more non-verbal images include one or more of an image of lips, an animated face, and an image of a heart.

26. A method as recited in claim 16, wherein the one or more non-verbal images are animated to exhibit one or more of a desired behavior and a desired action.

27. A method as recited in claim 16, further including an act of overlaying the contact control with one or more non-verbal images reflecting a status associated with the contact.

28. A method as recited in claim 27, wherein the one or more non-verbal images include one or more of a flag, a clock, a telephone, a beverage, a food item, and a game icon.

29. A method as recited in claim 27, wherein the status associated with the contact includes one or more of a network connectivity status, an application activity status, a location status, and a schedule status.

30. A computer program product for a computing system that is connected with a display device and that is configured to display one or more contact controls at the display device, the computer program product comprising a recordable-type computer readable medium having stored thereon computer executable instructions for implementing a method for utilizing the one or more contact controls displayed at the display device, the method being the method recited in claim 1.

31. A computer program product as recited in claim 30, wherein the recordable-type computer readable medium includes physical storage media.

32. A computer program product as recited in claim 30, wherein the contact control includes an image associated with the contact.

33. A computer program product as recited in claim 30, wherein accessing the one or more data sources associated with the contact includes displaying one or more database entries associated with the contact at the display device.

34. A computer program product as recited in claim 30, wherein the communicative action includes at least one of an instant message, an email, an electronic file transmission, a facsimile, a video feed, a video teleconference, a telephony call, and a telephone call.

35. A computer program product as recited in claim 34, wherein one form of the communicative action is initiated when either the contact control is dragged and dropped onto an application launch object and a different form of the communicative action is initiated when the application launch object is dragged and dropped onto the contact control.

36. A computer program product as recited in claim 34, wherein the application launch object includes an icon corresponding to the communication application, wherein the communication application is a different third-party application program.

37. A computer program product as recited in claim 34, wherein the application launch object includes an icon of a file that is utilized by the communication application.

38. A computer program product as recited in claim 30, further including an act of overlaying the contact control with one or more non-verbal images reflecting an emotional state associated with the contact.

39. A computer program product as recited in claim 38, wherein the one or more non-verbal images include one or more of an image of lips, an animated face, and an image of a heart.

40. A computer program product as recited in claim 30, further including an act of overlaying the contact control with one or more non-verbal images reflecting a status associated with the contact.

41. A computer program product as recited in claim 40, wherein the one or more non-verbal images include one or more of a flag, a clock, a telephone, a beverage, a food item, and a game icon.

42. A computer program product as recited in claim 30, wherein the method includes the act of initiating a communicative action with the contact when the user input further involves a communication application, and wherein the method includes the act of accessing one or more data sources associated with the contact when the user input includes making a selection of the contact control.

43. In a computing system that includes a plurality of third party application programs that are accessible through use of one or more contact controls, wherein the computing system is connected with a display device and is configured to display the one or more contact controls at the display device, a method for utilizing the one or more contact controls displayed at the display device to execute functions through the third party application programs, the method comprising:
  an act of a user interface module displaying a contact control, wherein the contact control is associated with a corresponding contact, is enabled to initiate a communicative action with the contact, and is enabled to access contact information associated with the corresponding contact, wherein the contact control is configured to be hosted by a third party application, the third party application being distinct and independent from the user interface module and the contact control, such that the third party application can designate how and where the contact control is to be displayed;
  an act of displaying a contact control at the display device as specified by the third party application;
  an act of receiving a user input that involves the contact control;
  upon receiving the user input, an act of accessing contact information associated with the corresponding contact;
  determining which of the accessed contact information is accurate and appropriate; and
  also upon receiving the user input, an act including at least one of initiating a communicative action with the contact and accessing one or more data sources associated with the contact.

44. A method as recited in claim 43, wherein the contact control includes a static image associated with the corresponding contact.

45. A method as recited in claim 44, wherein the third party application can control and edit the display of the static image.

46. A method as recited in claim 43, wherein the contact control includes an animated image configured to exhibit one of a non-verbal communication and a non-verbal action.

47. A method as recited in claim 46, wherein the third party application can control and edit the display of the animated image.

48. A method as recited in claim 1, wherein the communicative action comprises an act of copying or transferring contact information of the contact corresponding to the contact control from the external data source associated with the contact to a different data source that is associated with the communication application.

49. A method as recited in claim 16, wherein the communicative action comprises an act of copying or transferring contact information of the contact corresponding to the contact control from the external data source with which the contact control is linked to a different data source that is associated with the communication application.

50. A method as recited in claim 46, wherein initiating the communicative action comprises identifying from the user input that an icon associated with a different third-party application program has been positioned over the contact control.

* * * * *

UNITED STATES PATENT AND TRADEMARK OFFICE
CERTIFICATE OF CORRECTION

Page 1 of 1

PATENT NO. : 7,360,172 B2
APPLICATION NO. : 10/326660
DATED : April 15, 2008
INVENTOR(S) : Joel K. Grossman et al.

It is certified that error appears in the above-identified patent and that said Letters Patent is hereby corrected as shown below:

In column 9, line 39, delete "concuffently" and insert -- concurrently --, therefor.

Signed and Sealed this
Fifteenth Day of February, 2011

David J. Kappos
*Director of the United States Patent and Trademark Office*